US008504639B2

(12) United States Patent
Cochard et al.

(10) Patent No.: US 8,504,639 B2
(45) Date of Patent: Aug. 6, 2013

(54) WIRELESS COMMUNICATION DEVICE AND METHOD, AND SYSTEM COMPRISING SUCH A METHOD

(75) Inventors: Nicolas Cochard, Le Versoud (FR); Gilles Thonet, Meylan (FR); Olivier Coutelou, Grenoble (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 411 days.

(21) Appl. No.: 12/805,943

(22) Filed: Aug. 25, 2010

(65) Prior Publication Data
US 2011/0066750 A1    Mar. 17, 2011

(30) Foreign Application Priority Data
Sep. 15, 2009 (FR) ...................................... 09 04385

(51) Int. Cl.
*G06F 15/16* (2006.01)
(52) U.S. Cl.
USPC .......................................... 709/208; 709/209
(58) Field of Classification Search
USPC ................................. 709/208, 209
See application file for complete search history.

(56) References Cited

U.S. PATENT DOCUMENTS
2007/0201381 A1    8/2007    Ekl et al. ........................ 370/254

FOREIGN PATENT DOCUMENTS
| EP | 1 187 023 |    | 3/2002 |
| EP | 1187023 A1 | * | 3/2002 |
| EP | 1 821 467 |    | 8/2007 |
| EP | 1 850 203 |    | 10/2007 |

* cited by examiner

*Primary Examiner* — Huy D Vu
*Assistant Examiner* — Teisha D Hall
(74) *Attorney, Agent, or Firm* — Steptoe & Johnson LLP (57) ABSTRACT

The gateway communication device for wireless communication networks receives messages from a low-power transmitter and communicates with a network. In a system comprising several gateway devices for a low-power transmitter, a master gateway device is defined. Definition of a master gateway device is based on reception quality indicators of the gateway devices situated in said reception zone of messages transmitted by said low-power transmitter. The gateway device having the highest reception quality indicator is selected to be said master gateway device. The communication method also defines a master gateway device in the same way. The master gateway device then selects a backup gateway device to store link tables and in certain cases to act in the place of the master.

12 Claims, 8 Drawing Sheets

WIRELESS COMMUNICATION DEVICE AND METHOD, AND SYSTEM COMPRISING SUCH A METHOD

BACKGROUND OF THE INVENTION

The invention relates to a gateway communication device for wireless communication networks comprising:
- means for receiving communication messages transmitted by low-power transmitters,
- means for transmitting and receiving messages from a communication network, and
- means for processing communication messages.

The invention also relates to a communication system for wireless communication networks comprising:
- at least one communication network,
- at least one low-power transmitter device to send messages to a recipient device via said communication network, and
- at least two gateway communication devices able to receive messages from said low-power transmitter device and to communicate said messages over the communication network.

The invention further relates to a communication method for wireless communication networks comprising at least one low-power transmitter device and at least two gateway devices able to receive messages from said low-power transmitter device and to transmit and receive messages over the communication network.

STATE OF THE ART

Figure 1:
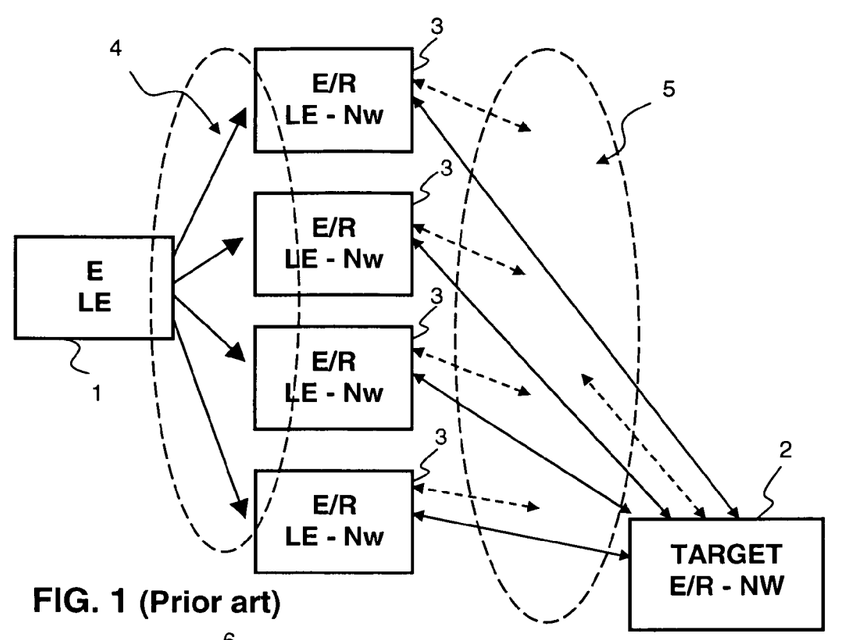
FIG. 1 represents a diagram of a known communication network.

In existing communication networks such as the one represented in FIG. 1, low-power wireless communication devices 1 transmit messages intended for target recipient devices 2. The short range of low-power transmitters does not generally enable the target to be reached directly. To achieve the link between the transmitter and recipient, gateway devices 3 can receive the low-power messages in a limited reception zone 4 and communicate over a wireless network 5 with higher transmission powers.

Low-power transmitters are, as a general rule, self-powered devices in particular for remote control of electric appliances. Some of them operate without a battery and generate their own power at each external action. Gateway devices and networks can be of the type described in Patent application EP1850203, in particular using mesh networks according to the technology referred to as "ZigBee" from the "ZigBee Alliance" association.

In state-of-the-art communication networks, the low-power transmitters transmit in a reduced reception zone and several gateway devices take over to send or route the message to the target or recipient device. The recipient is therefore liable to receive the same message several times. Even though the sequence number of the message enables the target to only process the message once, such a system is liable to generate a large increase of traffic within the network.

SUMMARY OF THE INVENTION

The object of the invention is to provide a gateway device for a wireless communication network and a system comprising such devices, and a communication method for a wireless communication network.

A gateway communication device for wireless communication networks according to the invention comprising:
- means for receiving communication messages transmitted by low-power transmitters,
- means for transmitting and receiving messages over a communication network, and
- means for processing communication messages, comprises
- means for determining a reception quality indicator associated with each message received from a low-power transmitter,
- means for storing said reception quality indicator,
- means for receiving notification messages transmitted by other gateway devices of a reception zone and comprising in their frames a transmitter gateway device identifier, an associated reception quality indicator and a sequence number of said message, and
- means for defining a master gateway device based on reception quality indicators of the gateway devices situated in said reception zone of messages transmitted by said low-power transmitter, the gateway device having the highest reception quality indicator being selected to be said master gateway device.

Advantageously, the communication device comprises:
- means for storing as master gateway device for a low-power transmitter device and means for performing priority transmission over the network of messages coming from said low-power transmitter,
- means for storing the identifiers of gateway devices situated in said reception zone, and
- acknowledgement means to send an acknowledgement to the other gateway devices of said reception zone that the message has been sent to said recipient device.

In a preferred embodiment, the communication device comprises:
- means for defining a backup gateway device based on reception quality indicators of the gateway devices situated in a reception zone of messages transmitted by said low-power transmitter, the gateway device having the highest reception quality indicator after that of the master gateway device being selected to be said backup gateway device, and
- storage means to store a copy of the identifiers of gateway devices situated in said reception zone stored in said master gateway device.

In a communication system for wireless communication networks according to the invention comprising:
- at least one communication network,
- at least one low-power transmitter device to send messages to a recipient device via said communication network, and
- at least two gateway communication devices able to receive messages from said low-power transmitter device and to communicate said messages over the communication network, at least two gateway communication devices are communication devices as defined above, at least a first of said gateway devices being defined as being master gateway device for the at least one low-power transmitter device.

Preferably, in the communication system at least a second of said gateway devices is defined as being the backup gateway device for the master gateway device associated with said low-power transmitter device, said backup gateway device containing a copy of a link table of said master gateway device.

A communication method according to the invention for wireless communication networks comprising at least one low-power transmitter device and at least two gateway devices able to receive messages from said low-power transmitter device and to transmit and receive messages from the communication network comprises     sending by a low-power transmitter device of a message intended for at least one target recipient device,     receipt of said message by at least two gateway devices,     defining a master gateway device for said low-power transmitter device by selecting the gateway device having the highest reception quality indicator among the gateway devices receiving the messages from said low-power transmitter device.

Advantageously, the communication method comprises definition of a new master gateway device on initialization when the former master gateway device is malfunctioning, when the former master gateway device no longer has the best reception quality index or when the low-power transmitter device is moved.

In a preferred embodiment, the communication method comprises definition of a backup gateway device to store association data between said master gateway device, said recipient device and the low-power transmitter device.

Preferably, definition of a backup gateway device comprises copying said association data of the master gateway device in a table of said backup gateway device.

Advantageously, the communication method comprises sending by a backup gateway device of messages intended for a recipient device in case of malfunctioning of said master gateway device.

The communication method comprises redundancy processing comprising:

receipt by a master gateway device of a first low-power message transmitted by a low-power transmitter device in its reception zone,     receipt of said first low-power message by a gateway device of said reception zone,     notification of said first message by said gateway device of the reception zone to said master gateway device, and     acknowledgement by said master device of sending of the first message to a recipient device.

In a preferred embodiment, the communication method comprises mobility processing comprising:

moving a low-power transmitter device, receipt of a second message transmitted by said low-power transmitter device in a second reception zone,     definition of a new master gateway device among the gateway devices of said second zone receiving the second message,     announcing the new master to the communication network, identifying the previous master,     retrieval of the data by the new master,     transmission of messages to the recipient device, and     nomination of a new backup gateway device by the new master gateway device.

BRIEF DESCRIPTION OF THE DRAWINGS

Other advantages and features will become more clearly apparent from the following description of particular embodiments of the invention, given for non-restrictive example purposes only and represented in the accompanying drawings, in which.

DETAILED DESCRIPTION OF PREFERRED EMBODIMENTS

Figure 2:
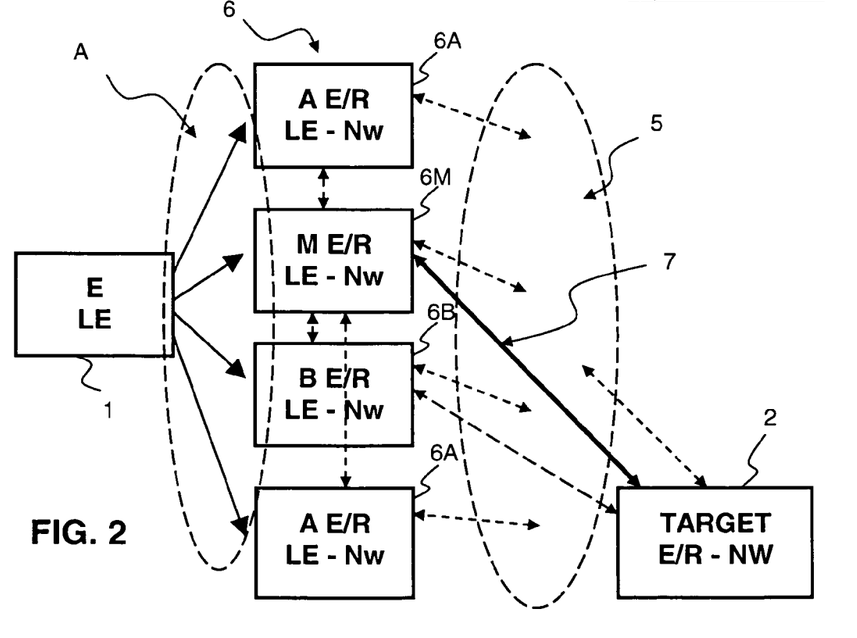
FIG. 2 represents a diagram of a communication network according to an embodiment of the invention.

A communication system for wireless communication networks according to an embodiment of the invention is represented in FIG. 2. This system comprises at least one low-power transmitter device 1 to send messages to a recipient device 2 and at least two gateway communication devices 6, 6A, 6M, 6B. The devices 6 being able to receive messages from said low-power transmitter device 1 communicate said messages over the communication network via said wireless communication network 5. Among the gateway communication devices, a first device 6M is defined as being master gateway device for the low-power transmitter device and a second device 6B is defined as being backup gateway device. To replace the master gateway device associated with said low-power transmitter device, the backup gateway device contains a copy of a link table of the master gateway device. Advantageously, this copy limited to the backup gateway device enables the memory size of each gateway device to be limited.

The gateway devices 6, 6A, 6M, 6B of the reception zone receive the message from the low-power transmitter 1. They then communicate with one another to determine the master gateway device 6M having the best reception quality. This master device 6M will communicate in priority to the network 5 with the target recipient device 2 (link 7 in FIG. 2). The master device nominates a backup gateway device 6B having the second best reception quality. The backup device 6B replaces the master device for communicating messages to the recipient device in case of non-availability or malfunctioning of the master device. In case of non-sending of the message by the master and backup devices, other gateway devices 6A of the reception zone define a new master gateway device for sending messages to the target. This method of defining a new master gateway device can be triggered when the former master device no longer has the best reception quality or when the low-power transmitter is moved.

Such an operation also enables any one of the devices of the reception zone to receive the low-power message and transmit it to the master device. The master device that did not receive the signal directly will then transmit the message to the target. This possibility enables the dependability of the system to be significantly enhanced without increasing the traffic too much.

To identify the best reception quality, each gateway device has a reception quality indicator RQI which it associates with each message received and/or with the sequence number SqN of said low-power message and with the device address or identifier. This indicator is stored and sent to the other gateway devices of the reception zone with the sequence number and identifiers to define the master gateway device. During this exchange process, the gateway devices of the reception zone have a table with the addresses or identifiers of the gateway devices concerned and their reception quality indicator RQI. The gateway device that has the highest reception quality indicator RQI is defined as master device. If devices have the same highest RQI, another additional condition can then be used such as their address value, highest or lowest.

Figure 3:
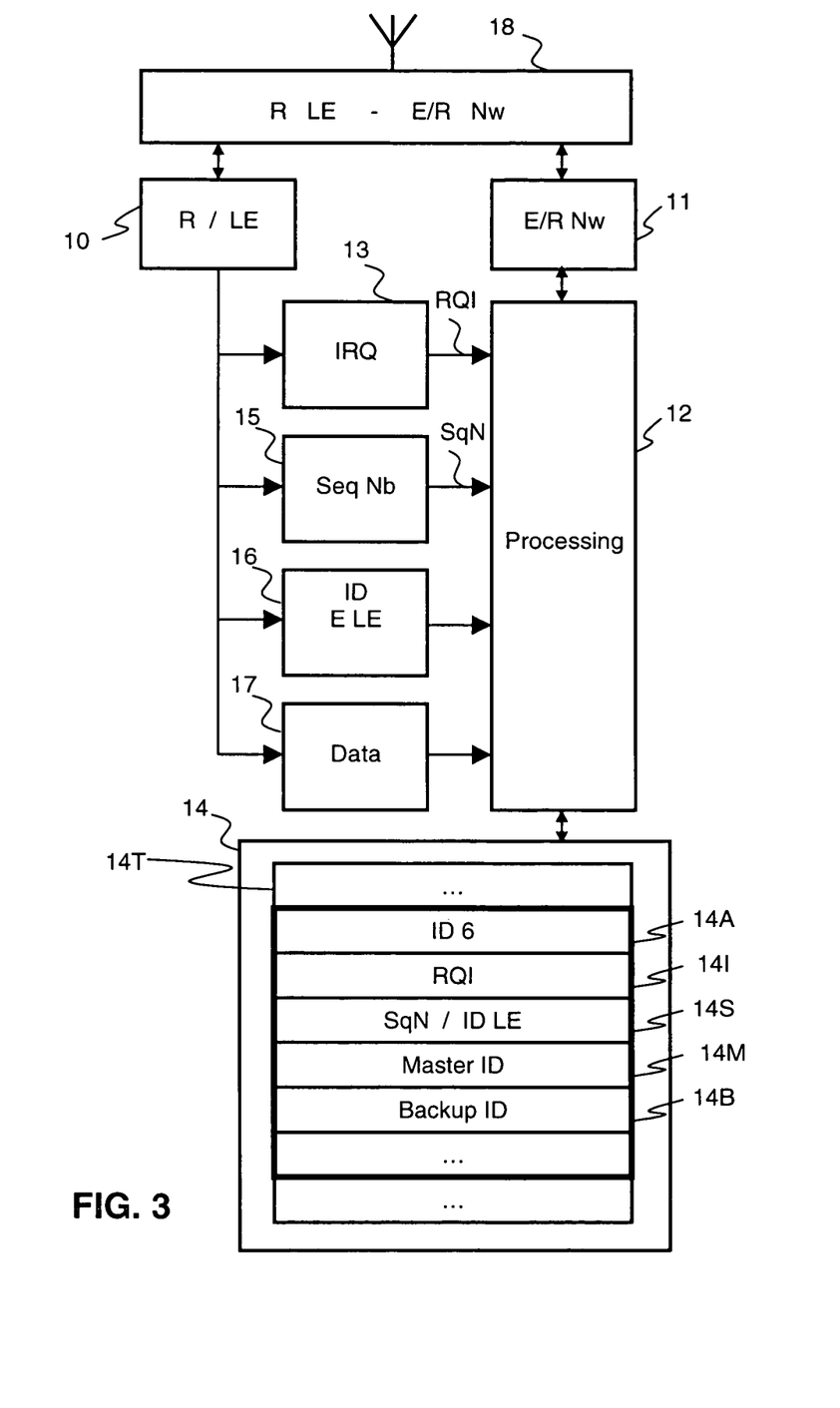
FIG. 3 represents a block diagram of a gateway device according to an embodiment of the invention.

FIG. 3 shows a block diagram of a gateway device 6 according to an embodiment of the invention. The gateway communication device for wireless communication networks comprises a receipt module 10 of communication messages transmitted by low-power transmitters 1, a message transmission and receipt module 11 to communicate with a communication network 5, and a processing circuit 12 of communication messages having frames comprising at least one transmitter device identifier, a message sequence number, and data.

Such a gateway device also comprises a module 13 for determining a reception quality indicator RQI associated with each message received from a low-power transmitter, and a storage module 14 to store the reception quality indicator. The processing circuit 12 processes receipt of notification messages transmitted by other gateway devices. The messages contain in their frames a transmitter gateway device identifier 14A, an associated reception quality indicator RQI, 14I, a sequence number SqN, 14S of said message, and a low-power transmitter identifier. The circuit 12 stores this data in a table 14T of the storage module 14. The processing circuit 12 processes definition of a master gateway device based on reception quality indicators of the gateway devices situated in a reception zone A of messages transmitted by the low-power transmitter. The gateway device having the highest reception quality indicator is thus selected to be master gateway device.

In FIG. 3 the gateway device comprises a module 15 for processing a sequence number SqN, a module 16 for processing an identifier, and a module 17 for processing data present in messages received from a low-power transmitter.

A master gateway device has data in its storage module 14 identifying it as master gateway device for a low-power transmitter device. Its processing circuit 12 processes priority transmission over the network of messages coming from said low-power transmitter with priority over the other devices. The storage module 14 of the master gateway device 6M also stores the identifiers of the other gateway devices located in said reception zone. The processing circuit thus comprises an acknowledge function to send an indication to the other gateway devices of the reception zone that the message has been sent to said recipient device 2.

A communication device according to one embodiment of the invention can also be defined as being backup gateway device. Definition of a backup gateway device is also based on the reception quality indexes RQI of the gateway devices located in a reception zone of messages transmitted by the low-power transmitter. Thus, the gateway device having the highest reception quality indicator after that of said master gateway device 6M is selected to be said backup gateway device 6B. The storage module 14 stores a copy of the identifiers of gateway devices located in said reception zone and stored in said master gateway device, and also stores a copy of a link table relative to the low-power transmitter. The processing circuit of a backup gateway device also comprises an acknowledge function to send an indication to the other gateway devices of the reception zone that the message has been sent to said recipient device in case of non-availability of said master gateway device.

The gateway devices preferably comprise a single radio transceiver 18 to receive the messages from the low-power transmitter 1 and to communicate bi-directionally with the network 5.

A communication method according to one embodiment of invention is designed for wireless communication networks comprising at least one low-power transmitter device and at least two gateway devices able to receive messages from a low-power transmitter device and to communicate with a network on transmission and receipt of the messages. In this method the following steps are present in several operating phases:

sending by a low-power transmitter device 1 of a message intended for at least one target recipient device 2, receipt of said message by at least two gateway devices 6, 6A, 6B, 6M, and definition of a master gateway device 6M for said low-power transmitter device. Selection of a master gateway device is based on the reception quality indicators RQI. The device having the highest reception quality indicator among the gateway devices receiving the messages from said low-power device thus becomes the master gateway device.

Figure 4:
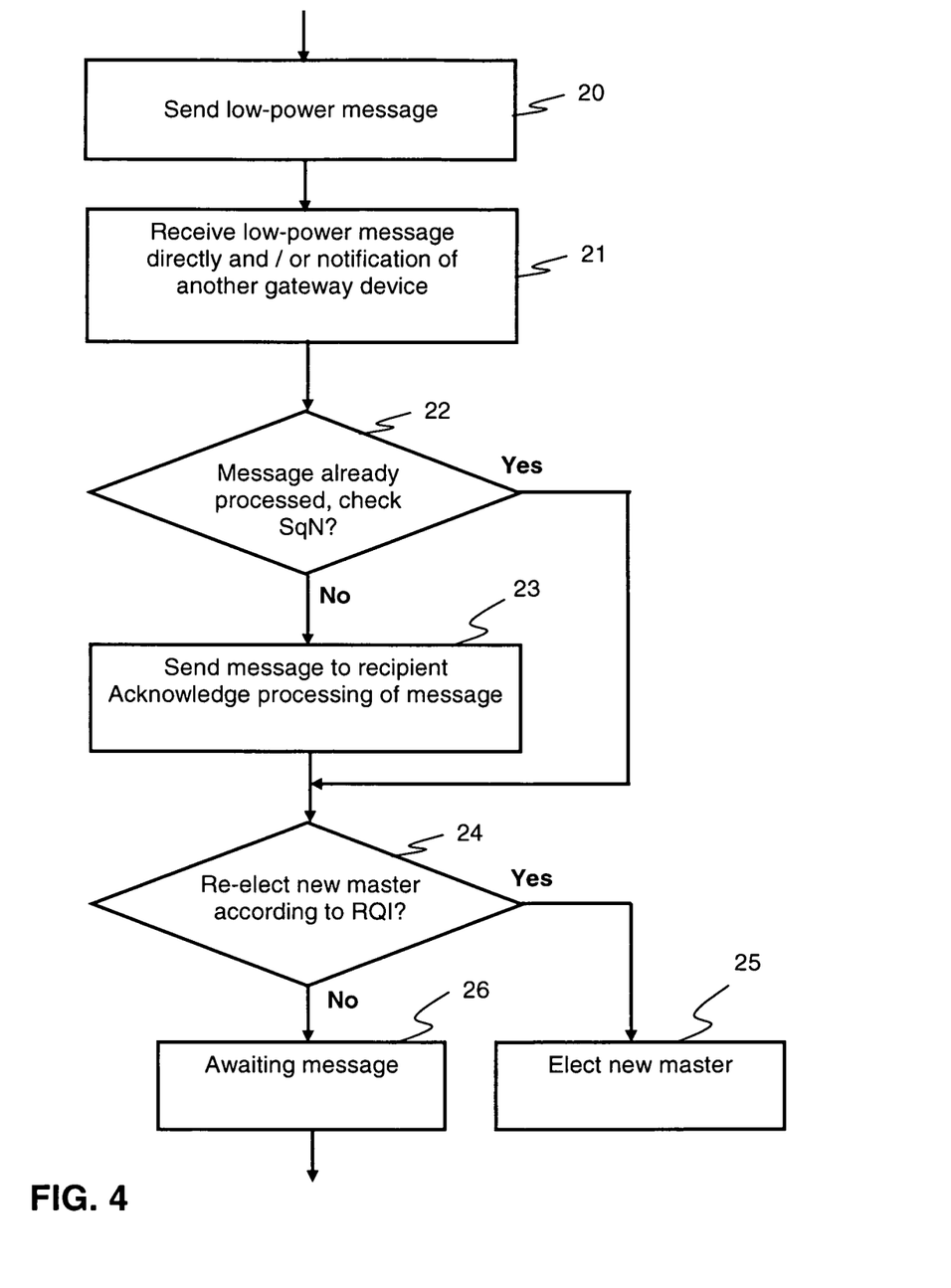
FIG. 4 represents a first flowchart of operation of a master gateway device of a method according to an embodiment of the invention.

FIG. 4 represents a first flowchart of operation of a master gateway device. In a step 20, a low-power transmitter device sends a message in a limited reception zone. In a step 21, a master gateway device receives the message identified by a sequence number and an identification number from the low-power transmitter either directly and/or via another gateway device. A step 22 performs a check of processing of the message, checking whether the message has already been processed by the master gateway device. If the message has not yet been processed, the master device processes the message in a step 23, sends it to the recipient and notifies acknowledgement to the other devices of the reception zone whose addresses or identifiers are stored in the master device. As the device received the message directly and via the other devices of the zone, re-election of a new master gateway device can be triggered according to the different reception quality indicators in steps 24 and 25. This election is not compulsorily systematic at each message and can be driven by particular events such as malfunctioning of a master device or backup device or be time-staggered. Then a new message is awaited in a step 26.

Figure 5:
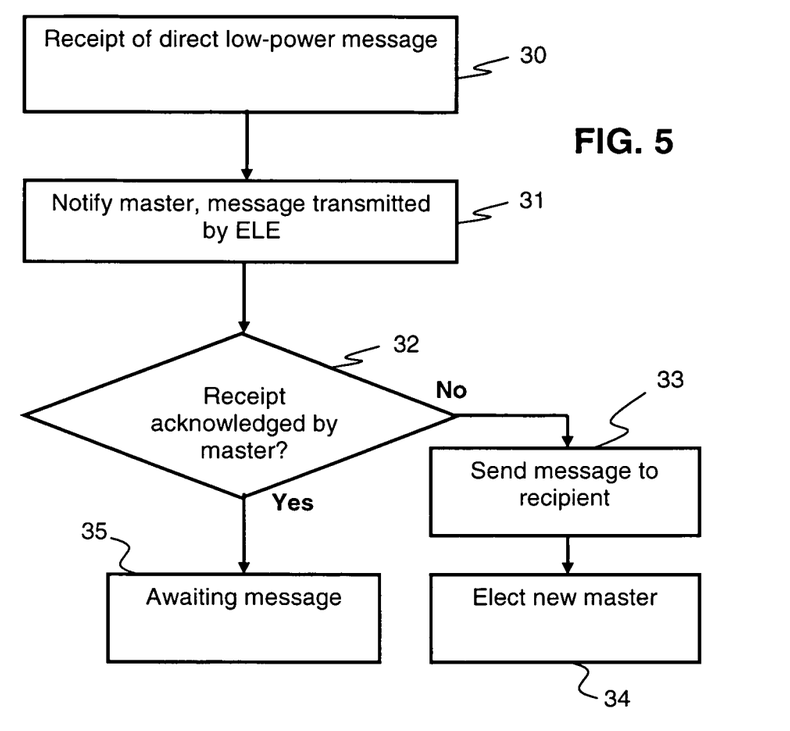
FIG. 5 represents a second flowchart of operation of a backup gateway device of a method according to an embodiment of the invention.

A second flowchart in FIG. 5 represents operation of a backup gateway device. In a step 30, the backup gateway device receives a new message from a low-power transmitter. Then it notifies the message to the associated master device in step 31. A step 32 checks receipt of the acknowledgement which has to be sent by the master device. If the acknowledgement is not received, the backup gateway device sends the message to the recipient in a step 33 and triggers election of a new master gateway device in step 34. If not, a new message is awaited in a step 35.

Figure 6:
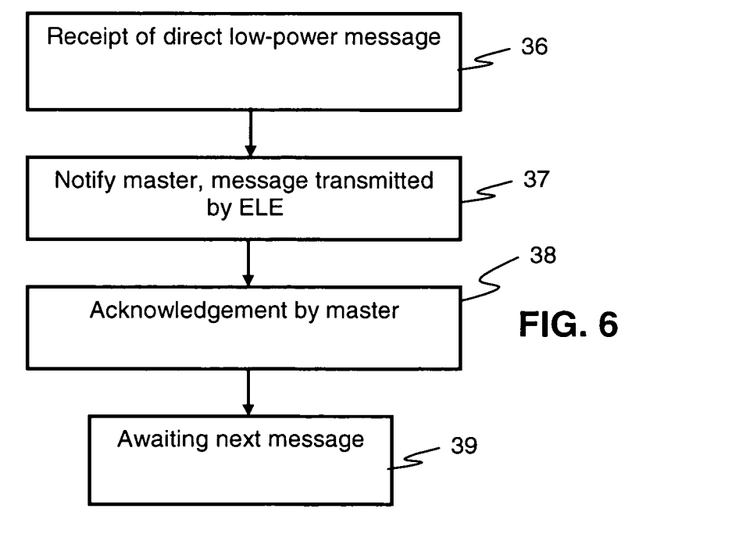
FIG. 6 represents a third flowchart of operation of a gateway device of the reception zone of a method according to an embodiment of the invention.

The other devices of the reception zone of a low-power transmitter operate in receipt redundancy according to a flowchart represented in FIG. 6. Receipt of a low-power message by a gateway device of the reception zone is performed in a step 36. During this time, a master gateway device also receives this message in step 21. In a step 37, the message is notified to the associated master gateway device by the gateway device of the reception zone. Then in step 38, the gateway device of the reception zone receives the acknowledgement by said master device of sending of a message to a recipient device 2. A new message is then awaited in a step 39.

Figure 7:
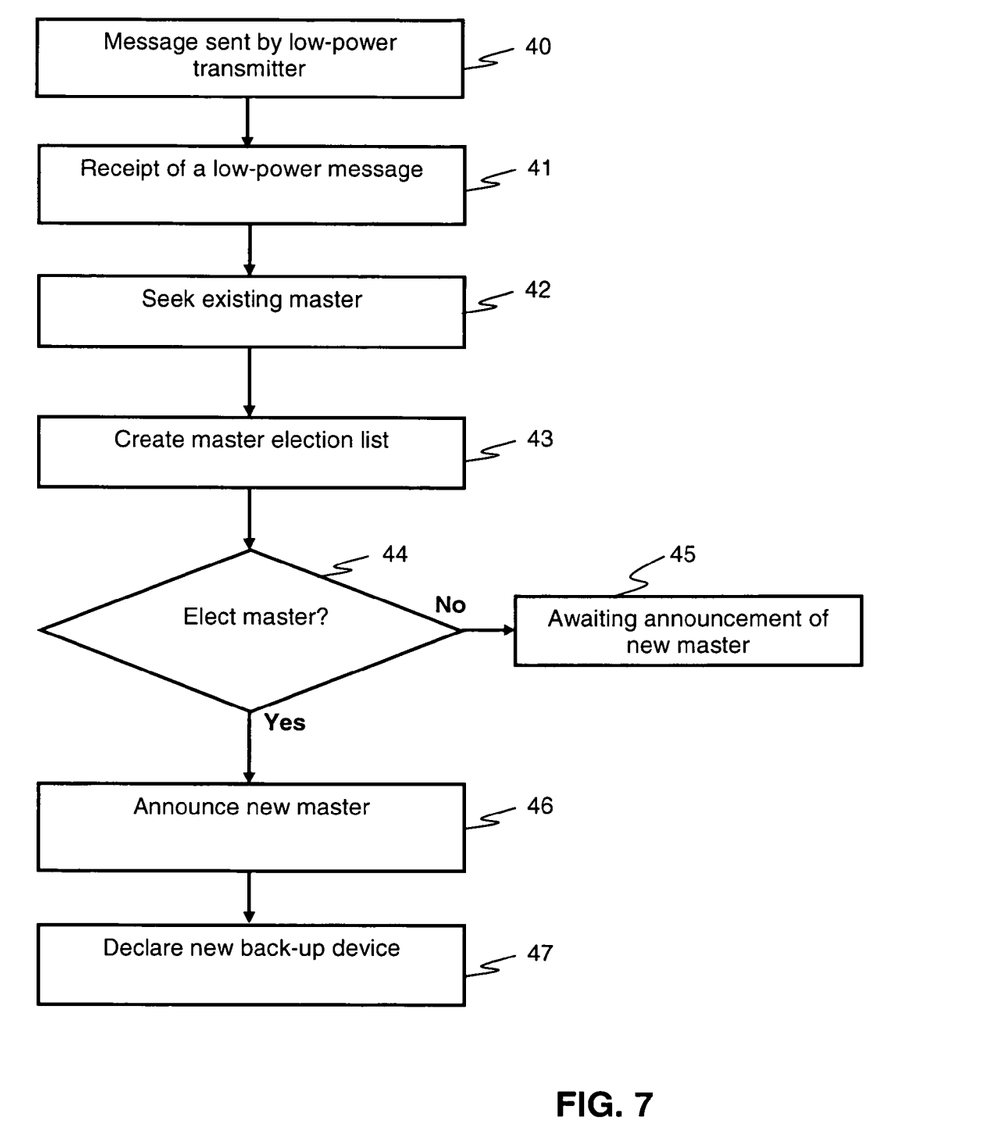
FIG. 7 represents a flowchart of definition of a master gateway device of a method according to an embodiment of the invention.

FIG. 7 represents a flowchart of definition of a master gateway device in a method according to an embodiment of the invention. Definition of a new master gateway device can be performed automatically on initialization, when the former master gateway device is malfunctioning, when the former master gateway device no longer has the best reception quality index and/or when the low-power transmitter device is moved.

Figure 8:
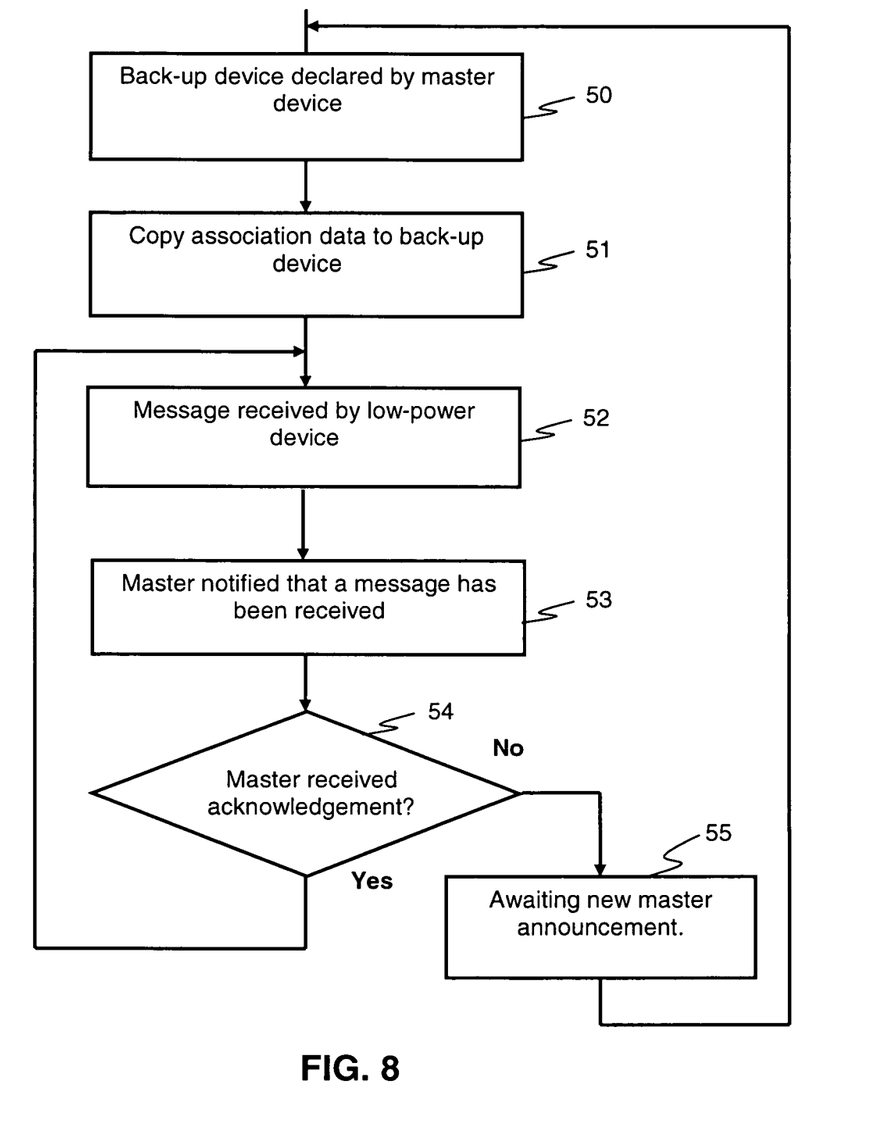
FIG. 8 represents a flowchart of definition of a backup gateway device of a method according to an embodiment of the invention.

In a step 40, a message intended for at least one target device is sent by a low-power transmitter. At least two gateway devices receive the low-power message in a step 41. Definition of a master gateway device for said low-power transmitter device is then performed by selecting a gateway device having the highest reception quality indicator among the gateway devices receiving the messages from said low-power transmitter device. In a step 42, the presence of a former master device is checked. A step 43 enables a master device election list to be established by storing the identifiers of the reception zone devices and their associated reception quality indicators for a given message identified by its sequence number. A step 44 checks election of the master device. If the device receiving the signal is not the new master, it waits in a step 45 for the announcement of a new master emanating via a notification transmitted over the network. If the device receiving the message signal is defined as being the new master, it announces this to the other devices of the zone via the network in a step 46. Then, in a step 47, the new master gateway device nominates the new backup gateway device. Nomination of the backup gateway device is based on the reception quality indexes of the gateway devices situated in a reception zone of messages transmitted by said low-power transmitter. The gateway device having the highest reception quality indicator after that of said master gateway device is thus selected to be said backup gateway device, FIG. 8 represents a flowchart of nomination of a backup gateway device of a method according to an embodiment of the invention. Nomination of a backup gateway device is scheduled to store association data between the master gateway device, the recipient device and the low-power transmitter device. Nomination of a backup gateway device by a master gateway device is performed in a step 50.

Copying the master gateway device association data in a table of said backup gateway device is performed in a step 51. Thus, the backup gateway device receives a message from a low-power transmitter in a step 52. In a step 53, it notifies the master device of receipt of the message. A step 54 checks receipt of the acknowledgement that has to come from the master device. If the acknowledgement is not received, definition of a new master gateway device is performed in a step 55. In this case, the backup gateway device proceeds to send the message to the recipient device in case of malfunctioning of said master gateway device. If the acknowledgement is received, a new low-power message is awaited.

Figure 9:
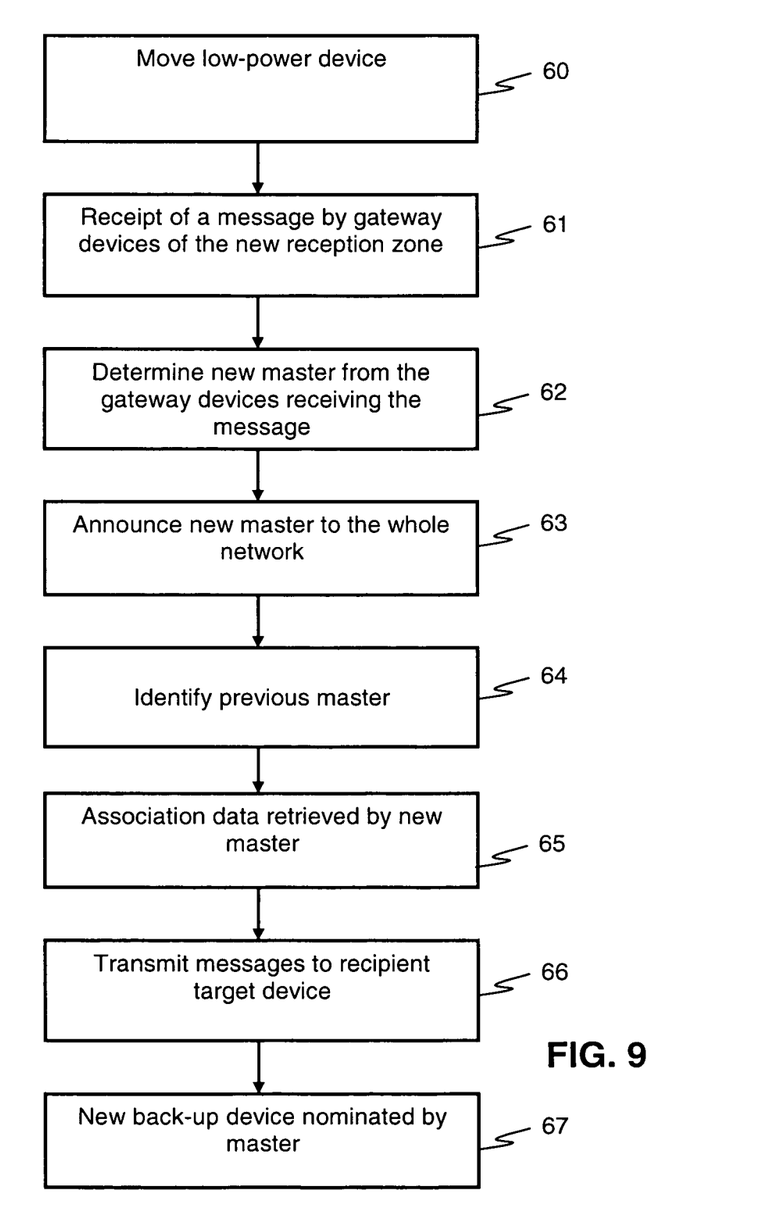
FIG. 9 represents a flowchart of processing of movement of a low-power transmitter device of a method according to an embodiment of the invention.

FIG. 9 represents a flowchart of processing movement of a low-power transmitter device of a method according to an embodiment of the invention. For mobility processing, a step 60 indicates movement of a low-power transmitter device from a first zone A1 to a second reception zone A2. In a step 61, another message transmitted by said low-power transmitter device takes place in the second reception zone. Then, definition of a new master gateway device from among the gateway devices of the second zone receiving the message is performed in a step 62. In a step 63, the new master gateway device is announced over the communication network. The previous master device is identified in a step 64, which enables the data to be retrieved by the new master device in a step 65. Messages are sent to the recipient device in step 66. Nomination of a new backup gateway device by the new master gateway device is performed in step 67. Such a method enables a low-power transmitter to be moved without having to perform new parameter settings. Adaptation is automatic even with changes of reception zones very far from one another.

Figure 10A:
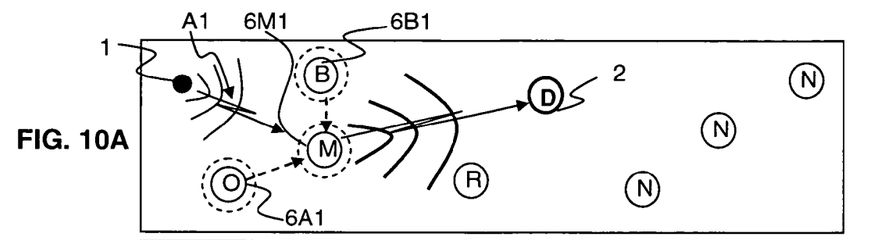
FIGS. 10A to 10F illustrate processing of movement of a low-power transmitter device of a method according to an embodiment of the invention.
Figure 10B:
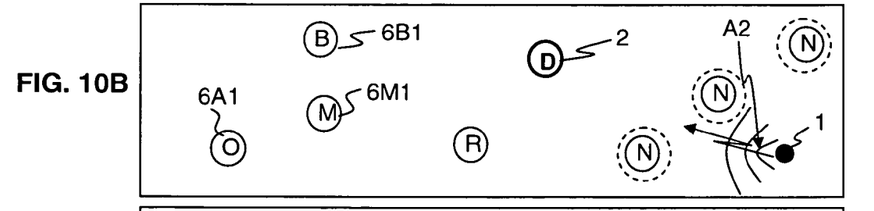
Figure 10C:
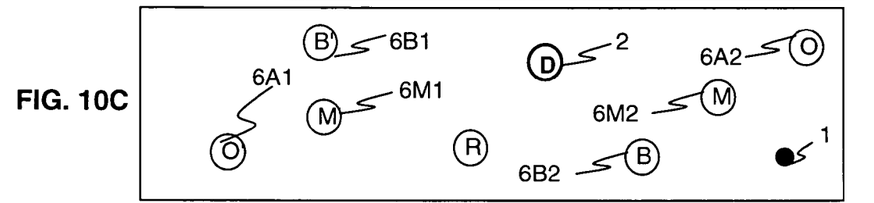
Figure 10D:
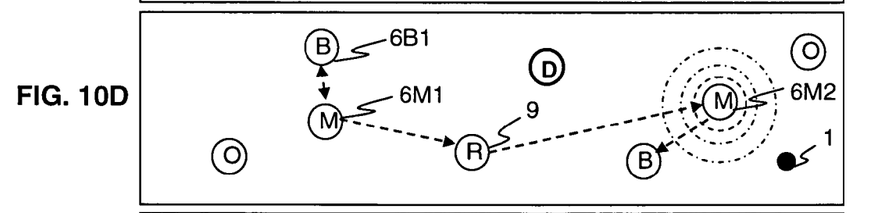
Figure 10E:
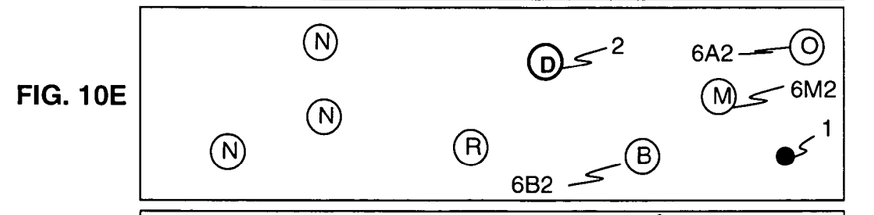
Figure 10F:
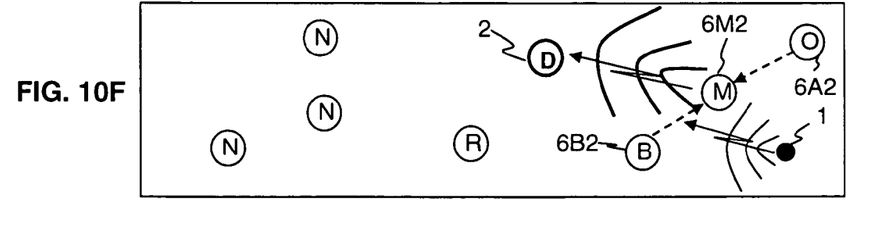

FIGS. 10A to 10F illustrate processing of movement of a low-power transmitter device of a method according to an embodiment of the invention. In FIG. 10A, a low-power transmitter is situated in a first zone A1. A first master gateway device 6M1 is defined and its backup device 6B1 is nominated. Another gateway device 6A1 of zone A1 notifies the messages to the master device 6M1 which transmits the messages to the recipient device 2. In FIG. 10B, the low-power transmitter is moved into a second zone A2 in which the former gateway devices can no longer receive. FIG. 10C shows the new devices able to receive the messages transmitted by the low-power transmitter 1. The method for defining the new master device 6M2, for nominating the new backup device 6B2 and the new zone redundancy devices 6A2 is triggered. In FIG. 10D, the new master gateway device 6M2 retrieves the data from the former master device via the network. This data can advantageously pass through several nodes 9 of a mesh network, and can also be supplied by the former backup device 6B1. In FIG. 10E, the former gateway devices are deactivated by notification on the network. In FIG. 10F, the new system operates in the new zone A2, most of the messages from the low-power transmitter being transmitted to the target recipient device via the master gateway device 6M2.

Self-powered low-power transmitter devices send short messages. These messages are preferably sent several times to increase the probability of receipt. During repetition of the messages, the sequence number does not change.

The gateway communication devices described above can take several forms in particular that of simple gateways or of devices usually referred to by the term "PROXY" performing certain communication functions in the place of the others.

The invention claimed is:

1. An individual gateway communication device for use in a wireless communication network, which network includes a plurality of said gateway communication devices, said individual device comprising:
   means for receiving communication messages transmitted by from low-power transmitters,
   means for transmitting and receiving messages by the communication network that comprises a plurality of said gateway communication devices, and means for processing communication messages, comprising
      means for identifying a reception quality indicator in a message received from a low-power transmitter,
      means for storing said reception quality indicator,
      means for receiving notification messages transmitted by other gateway devices located in a reception zone, where each such notification message comprises in their frames a transmitter gateway device identifier, a reception quality indicator and a sequence number of said message, and
      means for identifying a master gateway device based on reception quality indicators stored in the gateway devices situated in said reception zone of messages transmitted by said low-power transmitter, whereby the gateway device having the highest reception quality indicator is identified as said master gateway device.

2. A gateway communication device according to claim 1, comprising: means for storing in said gateway device data identifying a master gateway device for a low-power transmitter device, and means for performing priority transmission over such a network, of messages coming from said low-power transmitter, means for storing identifiers of gateway devices situated in said reception zone, and acknowledgement means for sending an acknowledgement to other gateway devices located in said reception zone that a message has been received by the gateway communication device.

3. A gateway communication device according to claim 1, comprising: means for identifying a backup gateway device based on reception quality indicators of gateway devices situated in a reception zone of messages transmitted by said low-power transmitter, the gateway device having the next highest reception quality indicator, after that of the master gateway, being said backup gateway device, and storage means for storing in the gateway communication device a copy of the identifiers of gateway devices situated in said reception zone stored in said master gateway device.

4. A communication system for wireless communication networks comprising:
    at least one communication network,
    at least one low-power transmitter device for sending messages to a recipient device via said communication network,
    at least two gateway communication devices able to receive messages from a low-power transmitter device and to communicate said messages over the communication network, and
    at least two gateway communication devices according to claim 1, at least a first of said gateway communication devices being a master gateway device for the at least one low-power transmitter device.

5. A communication system according to claim 4 wherein at least a second of said gateway devices is a backup gateway device for the master gateway device associated with said low-power transmitter device, said master gateway device having a link table, and
    said backup gateway device comprising a copy of the link table of said master gateway device.

6. A communication method for wireless communication networks comprising at least one low-power transmitter device and at least two gateway devices able to receive messages from said low-power transmitter device and to transmit and receive messages from a communication network,
    the method comprising
        sending by a low-power transmitter device of a message intended for at least one target recipient device,
        receipt of said message by at least two gateway devices,
        identifying a master gateway device which is the gateway device having the highest reception quality indicator among the gateway devices receiving the messages from said low-power transmitter device.

7. A communication method according to claim 6 comprising automatically initializing a new master gateway device, when the former master gateway device is malfunctioning, when the former master gateway device no longer has the best reception quality indicator, or when the low-power transmitter device is moved.

8. A communication method according to claim 6 wherein a backup gateway device stores association data between said master gateway device, a recipient device, and the low-power transmitter device.

9. A communication method according to claim 8 wherein the backup gateway device copies said association data from the master gateway device into a table of said backup gateway device.

10. A communication method according to claim 8 comprising sending by a backup gateway device of messages intended for a recipient device during malfunctioning of said master gateway device.

11. A communication method according to claim 6 comprising redundancy processing comprising:
    receipt by a master gateway device in its reception zone of a first low-power message transmitted by a low-power transmitter device,
    receipt of said first low-power message by a gateway device in said reception zone,
    notification to said master gateway device of receipt of said first message by said gateway device in the reception zone, and
    acknowledgement by said master device of sending of the first message to a recipient device.

12. A communication method according to claim 6 comprising mobility processing comprising:
    moving a low-power transmitter device,
    receipt of a second message transmitted by said low-power transmitter device in a second reception zone,
    identifying and announcing to the communication network a new master gateway device among the gateway devices of in said second zone receiving the second message,
    retrieval of data by the new master gateway device from the previous master gateway device,
    transmission of messages to the recipient device, and
    identifying a new backup gateway device by the new master gateway device.

* * * * *